United States Patent [19]

Muterspaugh et al.

[11] 4,316,220
[45] Feb. 16, 1982

[54] IF BANDPASS SHAPING CIRCUITS

[75] Inventors: Max W. Muterspaugh, Indianapolis, Ind.; Gerald E. Theriault, Hopewell, N.J.

[73] Assignee: RCA Corporation, New York, N.Y.

[21] Appl. No.: 190,278

[22] Filed: Sep. 24, 1980

[51] Int. Cl.³ .......................... H04N 5/44; H03H 9/00
[52] U.S. Cl. ..................................... 358/196; 333/193
[58] Field of Search ...................... 358/196, 191.1, 188, 358/904; 333/193–196; 465/339, 340

[56] References Cited

U.S. PATENT DOCUMENTS

| | | | |
|---|---|---|---|
| 3,621,482 | 11/1971 | Adler | 333/72 |
| 3,872,387 | 3/1975 | Banach | 358/904 |
| 3,911,381 | 10/1975 | Brooks et al. | 333/72 |
| 4,006,290 | 2/1977 | Momberger et al. | 333/193 |
| 4,107,730 | 8/1978 | Jones | 358/196 |
| 4,126,837 | 11/1978 | Koyamada et al. | 333/193 |

Primary Examiner—John C. Martin
Attorney, Agent, or Firm—E. M. Whitacre; P. J. Rasmussen; S. J. Stevens

[57] ABSTRACT

An IF bandpass shaping circuit for use with a television receiver having a tuner for providing intermediate frequency signals comprises a surface acoustic wave (SAW) filter coupled to the tuner. The SAW filter provides a predetermined bandpass response. A tuned circuit is coupled between the tuner and the output of the SAW filter. The tuned circuit is responsive to a frequency bandwidth which is narrow relative to the response of the SAW filter. The tuned circuit response is added to the output of the SAW filter to provide a modified SAW filter response.

7 Claims, 4 Drawing Figures

IF BANDPASS SHAPING CIRCUITS

This invention relates generally to IF bandpass shaping circuits, and, in particular, to novel IF bandpass shaping circuits incorporating surface acoustive wave filters.

Surface acoustic wave (SAW) filters are now used in color television receivers for bandpass shaping between the tuner and IF amplifier stages in order to eliminate many of the previously required IF alignments. The SAW filter comprises a piezoelectric substrate capable of propagating electromagnetic energy along its surface as acoustic waves. An input transducer made up of a number of interleaved fingers of an electrically conductive material is deposited on the substrate through conventional techniques. The transducer is coupled to a source of electrical signals. Acoustic surface waves then emanate from the transducer at right angles to the direction of transducer finger orientation. A similarly configured output transducer is responsive to the surface waves in such a manner as to produce an electrical signal output.

The SAW filter is made responsive to a selected frequency range of the input signals by the design of the input and output transducers. By varying the finger dimension and spacing within the transducers, it is possible to tailor a desired frequency response. The SAW filter is very selective and frequencies outside the chosen passband are sharply attenuated.

Selectivity makes the SAW filter useful as an intermediate frequency bandpass generator or shaper in a color television receiver. The SAW filter is coupled to the output of the tuner and provides the proper intermediate frequency signals to the IF amplifier stages and the video detector. A desirable feature of the SAW filter is that the passband frequency response is substantially unaffected by changes in environment or changes in impedance of input and output circuitry.

Because the frequency response of the SAW filter is determined substantially by the configuration of the input and output transducers, it is not readily adjustable nor is the characteristic frequency response curve easily altered. Although this property of the SAW filter is advantageous in that it provides stable operation, it is sometimes desirable to adjust the SAW filter response to improve receiver operation, such as in the reception of weak television signals.

A situation in which it would be desirable to adjust the response characteristic of a SAW filter occurs in dual-standard television receivers, such as those which are constructed for sale at U.S. military installations in Europe with capability for reception of locally broadcast programs transmitted on one standard (CCIR) and cable-supplied programs of a second standard (NTSC). Illustratively, such receivers are adapted to provide an IF picture carrier frequency of 45.75 MHz under either standard. The NTSC standard specifies a 4.5 MHz intercarrier spacing between the picture and the sound carriers resulting in the location of the IF sound carrier frequency at 41.25 MHz when the NTSC standard signals are received, while the CCIR (European) standard uses a 5.5 MHz intercarrier spacing, resulting in the location of the IF sound carrier frequency at 40.25 MHz when the CCIR standard signals are received. If the dual standard receiver incorporates a SAW filter designed to facilitate proper receiver operation during reception of NTSC standard signals, the SAW filter response is sufficiently attenuated at 41.25 MHz to insure that any 920 KHz beat signal which is produced from interaction between the IF sound carrier and the IF color subcarrier at 42.17 MHz is of a tolerably low magnitude to prevent interference. The attenuated response at 41.25 MHz is great enough, however, to insure development of an intercarrier sound signal (at 4.5 MHz) of adequate magnitude for proper activation of the sound circuits. It is also desirable to attenuate the response at 39.75 MHz, which is the upper adjacent channel picture carrier frequency for NTSC signals, as much as possible to prevent interference from an adjacent channel.

With such a SAW filter design, however, typically the SAW filter response at 40.25 MHz will be so greatly attenuated that the level of the intercarrier sound signal that can be developed at 5.5 MHz is inadequate for proper activation of the sound circuits during the reception of European standard programs.

Prior art techniques for modifying the SAW filter response curve to increase or decrease response at certain frequencies are disclosed in U.S. Pat. No. 3,621,482—Adler and U.S. Pat. No. 3,872,387—Banach. Adler illustrates the use of a photoresistive pattern applied to the piezoelectric substrate of the SAW filter between the input and output transducers. Controlling the light incident upon this pattern allows control of the frequency response of the SAW filter. Banach discloses a tuning element coupled to the output of the SAW filter. The tuning element is responsive to an AGC signal for increasing the selectivity of the SAW filter response in the presence of weak signals.

Neither of the previously described patents discloses a suitable solution to the problem described. Both Adler and Banach modify the overall SAW frequency response. With the problem described, it is undesirable to affect the overall response of the SAW filter to increase response at 40.25 MHZ, as that may degrade performance of the receiver in other aspects of its operation.

The present invention discloses a means for effectively modifying the response of a SAW filter in a selected frequency band (e.g., in the immediate vicinity at the frequency of the 40.25 MHz European IF sound carrier) without significantly affecting other regions of the response characteristic of the SAW filter. Unlike the apparatus illustrated in Banach, which uses cascaded circuit elements which effectively multiply response characteristics, the present invention modifies a SAW filter response by a technique which effectively adds response characteristics.

In accordance with the present invention an intermediate frequency bandpass shaping circuit for use in a television receiver having a tuner for receiving radio frequency signals and producing intermediate frequency signals therefrom comprises a surface acoustic wave filter having an input and an output and exhibiting a predetermined bandpass response. Means are coupled between the tuner and the filter input for applying the intermediate frequency signals to the filter input. Means are coupled between the tuner and the filter output for providing a bypass path around the surface acoustic wave filter for the intermediate frequency signals. The bypass path includes a bandpass filter which limits the signal passage via the bypass path to a band of frequencies of a width which is narrow relative to the width of the passband of the surface acoustic wave filter.

In the accompanying drawing.

Figure 1:
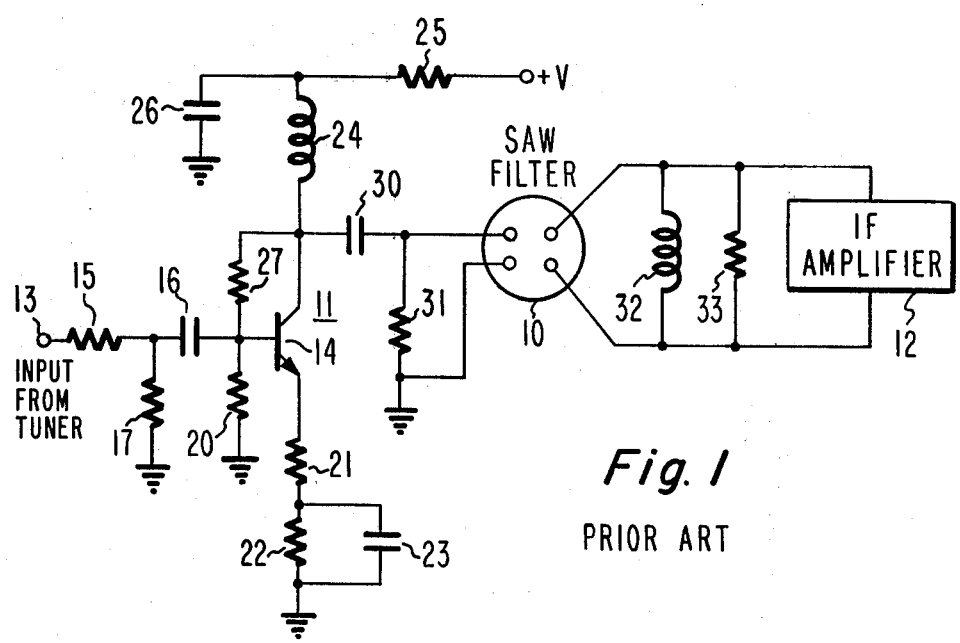
FIG. 1 is a schematic diagram of a SAW filter and preamplifier of a known design.

Referring to FIG. 1, there is shown an IF bandpass shaping circuit comprising a surface acoustic wave filter 10 having its input connected to a preamplifier 11 and its output connected to an IF amplifier 12. Preamplifier 11 is required in order to compensate for substantial energy losses in the SAW filter. These high energy losses are designed into the SAW filter as an attempt to reduce interference from triple transit signals and other spurious reflected signals.

The input 13 of preamplifier 11 is connected to the output of a tuner (not shown) which provides both picture and sound intermediate frequency signals to the IF stages. The intermediate frequency signals from the tuner present at input 13 are applied to the base of a transistor 14 through an input resistor 15 and a coupling capacitor 16. A resistor 17, coupled between the junction of resistor 15 and capacitor 16 and ground, provides impedance matching between the tuner and preamplifier 11. The base of transistor 14 is coupled to ground through a biasing resistor 20. The emitter circuit of transistor 14 comprises a degeneration resistor 21 and a biasing resistor 22 coupled to ground, and a bypass capacitor 23 coupled from the junction of the resistors 21 and 22 to ground. The collector of transistor 14 is coupled to a voltage source, designated as +V, through an inductor 24 and a resistor 25. The junction of inductor 24 and resistor 25 is coupled to ground through a filter capacitor 26. The collector of transistor 14 is also coupled back to the base through a feedback resistor 27. Resistors 21 and 27 control the gain of preamplifier 11. Resistor 22 and capacitor 23 act to minimize the effect of temperature changes on preamplifier gain. The values of resistors 17, 20, 21 and 27 determine the input and output impedance and gain of preamplifier 11.

Preamplifier 11 is coupled into SAW filter 10 from the collector of transistor 14 via a coupling capacitor 30. A load resistor 31 is connected between the two input terminals of SAW filter 10.

SAW filter 10 provides a balanced or differential output to cancel the effects of any stray capacitance at the SAW filter output, thereby preserving the desired frequency response of the SAW filter.

The output circuit of SAW filter 10 comprises the parallel combination of an inductor 32 and a resistor 33, connected across the output terminals of SAW filter 10. The output circuit is in turn connected to IF amplifier 12.

The value of inductor 24 is chosen to match the capacitive reactive input impedance of the SAW filter 10 so that only the resistive component of the input impedance remains. A more detailed description of the construction and operation of the preamplifier 11 may be found in U.S. Pat. application Ser. No. 097,041, filed Nov. 23, 1979, in the name of G. E. Theriault.

Figure 2:
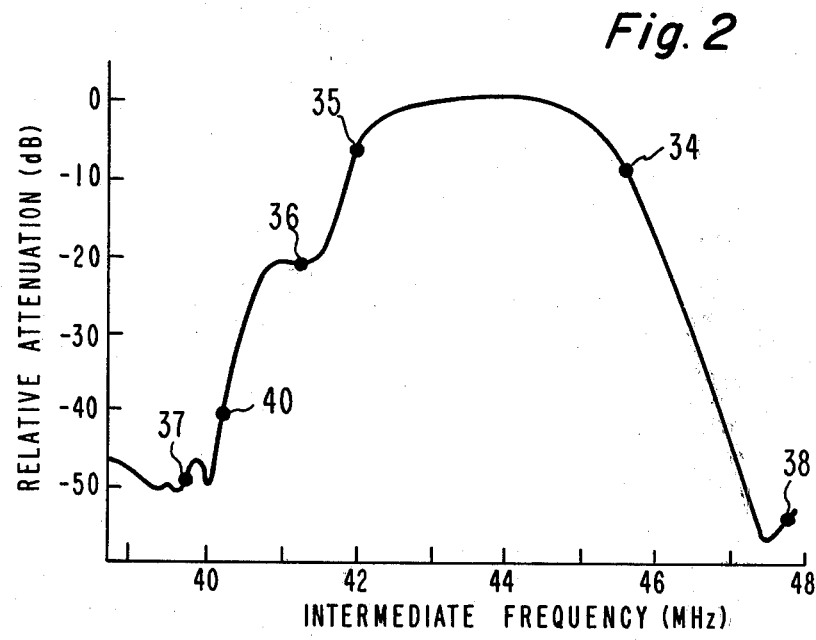
FIG. 2 is a graph of the frequency response characteristic of the circuit shown in FIG. 1.

FIG. 2 illustrates a graph of the frequency response at the output of the SAW filter for the circuit shown in FIG. 1. The location of the picture carrier is at 45.75 MHz, designated as point 34 in FIG. 2. The color subcarrier at 42.17 MHz is designated as point 35. The sound carrier, point 36, is located at 41.25 MHz and is sufficiently attenuated to prevent interaction with the color subcarrier (which results in an undesirable 920 KHz interference signal) yet is of a great enough magnitude to allow development of an adequate intercarrier sound signal. The upper adjacent channel picture carrier at 39.75 MHz (point 37) and lower adjacent channel sound carrier at 47.25 MHz (point 38) are greatly attenuated to prevent interference with the selected channel. The sharp rolloff of the IF response curve is also responsible for the high attenuation of the CCIR sound carrier at 40.25 MHz, designated as point 40. This attenuation, in the neighborhood of 40 db, reduces the CCIR sound carrier level to the point where an adequate intercarrier sound signal at 5.5 MHz cannot be developed for proper activation of the audio circuits.

Figure 3:
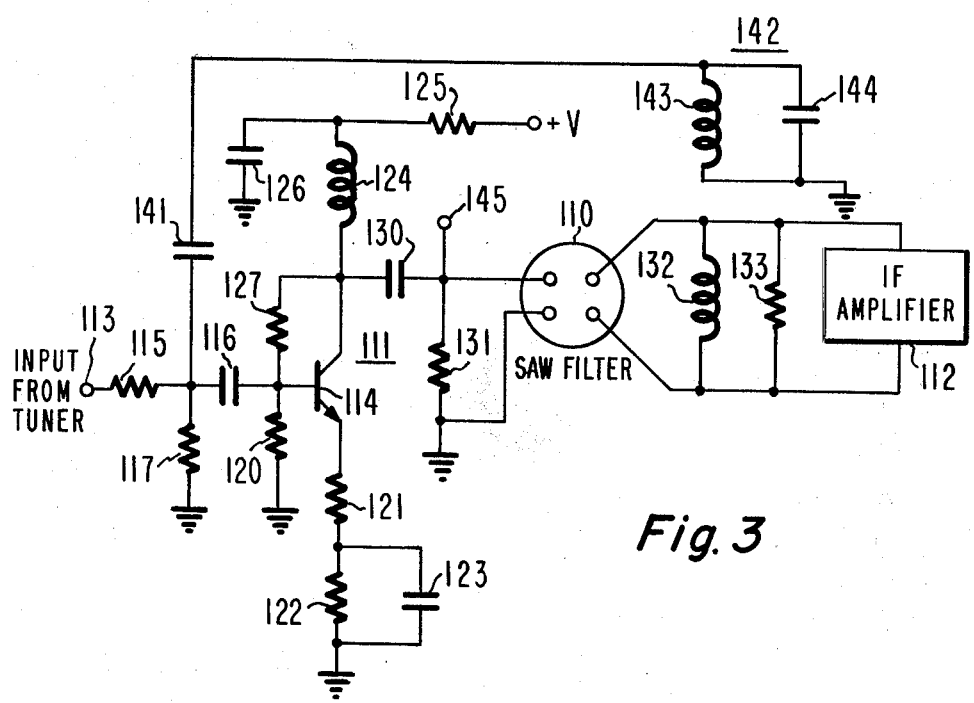
FIG. 3 is a schematic diagram of a SAW filter and preamplifier illustrating an embodiment of the present invention.

FIG. 3 illustrates an IF bandpass shaping circuit comprising a SAW filter and preamplifier incorporating a modification in accordance with the present invention which effectively modifies the IF response over a narrow band of frequencies. The SAW filter and preamplifier are similar in structure to the circuit of FIG. 1, and therefore corresponding components in FIG. 3 will be designated by the numerals used in FIG. 1, increased by 100. Therefore, FIG. 3 illustrates a SAW filter 110, a preamplifier 111 connected to the input of the SAW filter 110, and a SAW filter output circuit comprising the parallel combination of an inductor 132 and a resistor 133 coupled to an IF amplifier 112. In accordance with the invention, one terminal of a capacitor 141 is coupled to preamplifier 111 at the junction between input resistor 115 and coupling capacitor 116. The signal at this junction is essentially the unmodified output of the tuner.

The other terminal of capacitor 141 is coupled to a tuned circuit 142 comprising the parallel combination of an inductor 143 and a capacitor 144. Tuned circuit 142 is coupled to the output of SAW filter 110 through the magnetic coupling between inductor 143 and inductor 132.

The circuit shown in FIG. 3 operates in the following manner. Tuned circuit 142 is tuned by selection of proper component values for inductor 143 and capacitor 144 to the desired CCIR sound carrier frequency, e.g., 40.25 MHz. Tuned circuit 142 is constructed to have a high Q, thereby providing a narrow bandwidth about the desired frequency. Energy from tuned circuit 142 is coupled into the output of SAW filter 110 through the magnetic coupling between inductor 143 and inductor 132 in the SAW filter output circuit. Magnetic coupling between tuned circuit 142 and the output of the SAW filter modifies the SAW filter response over a narrow bandwidth without disturbing other regions of the SAW filter response. The present invention, therefore, uses a feed-forward technique to bypass the SAW filter for particular frequency signals in order to increase the SAW filter response in a particular frequency range. The apparatus of the present invention, therefore, adds two response characteristics together, as contrasted to the prior art techniques which use cascaded circuits to essentially multiply signal responses.

Figure 4:
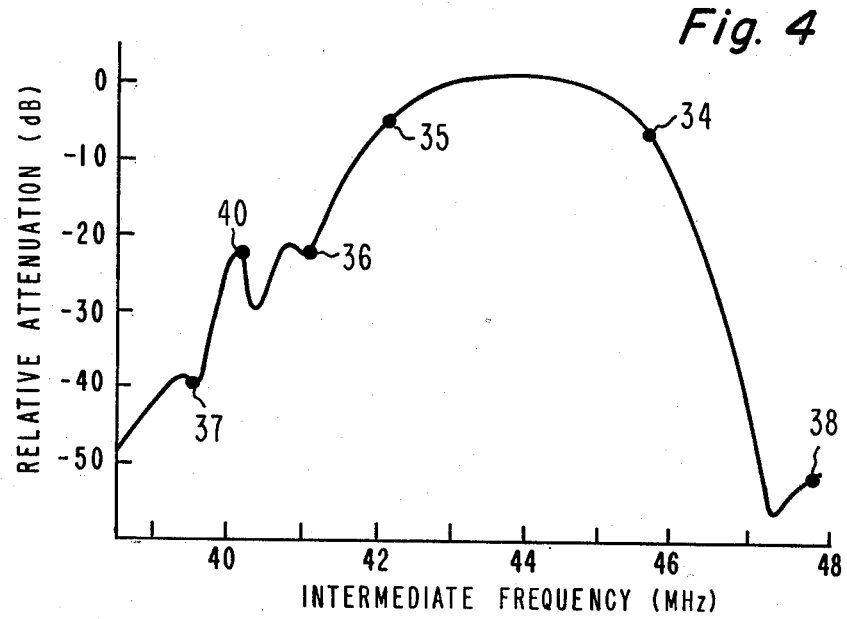
FIG. 4 is a graph of the frequency response characteristic of the circuit shown in FIG. 3.

FIG. 4 illustrates the IF response curve of the circuit shown in FIG. 3. The numerical designations used in FIG. 2 are also used in FIG. 4 to identify the location of corresponding signals on the response curve. The response at the CCIR sound carrier frequency has been increased to the point where an adequate intercarrier sound signal may be developed. The sharp rejection notch occurring on the curve between points 40 and 36 is caused by out-of-phase signal cancellations between the tuned circuit response and the SAW filter response at the point where the response curves are equal. It is important to maintain a narrow bandwidth of the tuned circuit, i.e., high Q, so that this rejection notch does not occur at the desired sound carrier frequency of 41.25 MHz. If this happens, sound performance during reception of NTSC signals will be degraded. Additionally, a wide bandwidth tuned circuit could also increase the response at the adjacent channel picture carrier frequency, 39.75 MHz, which could cause interference in the desired picture. It is clear also that the remainder of the response curve has been substantially unaffected by the increase in the response at 40.25 MHz.

It is also possible to connect the input of tuned circuit 142 near the output of preamplifier 111, for example at point 145, in order to provide an increased response at the tuned frequency, if this is necessary. The degree of coupling between inductors 143 and 132 can also be increased or decreased to increase or decrease the response level. Varying the value of capacitor 141 will also vary the response level.

For a single standard receiver, tuned circuit 142 could be tuned to the desired sound carrier frequency, e.g., 41.25 MHz for NTSC signals, to compensate for too great an attenuation in the SAW filter response at the sound carrier frequency. The present invention could also be utilized in conjunction with an automatic gain control circuit, for example, to selectively alter the IF bandpass response (e.g., with a diode switch) to improve reception of weak signals.

A circuit having the following component values provides the desired response characteristics.

| Component | Value |
|---|---|
| Resistor 115 | 20 ohms |
| Resistor 117 | 82 ohms |
| Resistor 120 | 560 ohms |
| Resistor 121 | 8.2 ohms |
| Resistor 122 | 56 ohms |
| Resistor 125 | 100 ohms |
| Resistor 127 | 2200 ohms |
| Resistor 131 | 470 ohms |
| Resistor 133 | 470 ohms |
| Capacitor 116 | 1000 picofarad |
| Capacitor 123 | 0.01 microfarad |
| Capacitor 126 | 1000 picofarad |
| Capacitor 130 | 1000 picofarad |
| Capacitor 141 | 4.7 picofarad |
| Capacitor 144 | 68 picofarad |
| Inductor 124 | 0.82 microhenry |
| Inductor 132 | 0.7–1.22 microhenry |
| Inductor 143 | 0.18–0.28 microhenry |
| +V | 11.4 volts. |

What is claimed is:

1. In a television receiver comprising a tuner for receiving radio frequency signals and producing intermediate frequency signals therefrom, an intermediate frequency bandpass shaping circuit comprising:
   a surface acoustic wave filter having an input and output and exhibiting a predetermined bandpass response;
   means coupled between said tuner and said input of said surface acoustic wave filter for applying said intermediate frequency signals to said input; and
   means coupled between said tuner and said output of said surface acoustic wave filter for providing a bypass path around said surface acoustic wave filter for said intermediate frequency signals, said bypass path including a bandpass filter limiting signal passage via said bandpass path to a band of frequencies of a width which is narrow relative to the width of the passband of said surface acoustic wave filter.

2. The arrangement defined in claim 1 wherein said means coupled between said tuner and said filter input comprises a preamplifier.

3. In a television receiver comprising a tuner subject to alternative reception of radio frequency signals of a first type, exhibiting a given spacing between picture and sound carrier frequencies, and radio frequency signals of a second type, exhibiting a spacing between picture and sound carrier frequencies which is greater than said given spacing, and producing from said radio frequency signals of said first type intermediate frequency signals including an intermediate frequency sound carrier signal of a first frequency, and producing from said radio frequency signals of said second type intermediate frequency signals including an intermediate frequency sound carrier signal of a second frequency; an intermediate frequency bandpass shaping circuit comprising:
   a surface acoustic wave filter having an input and output and exhibiting a predetermined bandpass response which provides a first level of response at said first frequency and provides a second level of response at said second frequency which is significantly below said first level;
   means coupled between said tuner and said input of said surface acoustic wave filter for applying said intermediate frequency signals to said input; and
   means coupled between said tuner and said output of said surface acoustic wave filter for providing a bypass path around said surface acoustic wave filter for said intermediate frequency signals, said bypass path including a bandpass filter limiting signal passage via said bypass path to a relatively narrow band of frequencies surrounding said second frequency and providing a third level of response at said second frequency, the sum of said second and third levels of response being substantially equal to said first level of response.

4. A bandpass filter circuit comprising:
   a source of electrical signals;
   a surface acoustic wave filter having a first frequency response characteristic, and having an input coupled to said source of electrical signals and an output;
   an output circuit coupled to said surface acoustic wave filter output;
   means exhibiting a second frequency response characteristic and including a tuned circuit coupled between said source of electrical signals and said output circuit, for producing at said output circuit a signal provided in accordance with a third frequency response characteristic corresponding to the sum of said second frequency response characteristic and said first frequency response characteristic.

5. The arrangement defined in claim 4, wherein said second frequency response characteristic is narrow relative to said first frequency response characteristic.

6. The arranged defined in claim 4, wherein said means including a tuned circuit is coupled to said output circuit via magnetic coupling means.

7. The arrangement defined in claim 4, wherein said second frequency response characteristic is adjustable.

* * * * *